United States Patent
Grahm et al.

(10) Patent No.: US 10,217,465 B2
(45) Date of Patent: Feb. 26, 2019

(54) WEARABLE DEVICE, SYSTEM AND METHOD FOR NAME RECOLLECTION

(71) Applicant: Sony Corporation, Tokyo (JP)

(72) Inventors: Torbjorn Grahm, Malmo (SE); Anders Svensson, Dalby (SE); Carl Fredrik Leandersson, Barseback (SE); Lars Berggren, Malmo (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 15/109,932

(22) PCT Filed: Dec. 11, 2014

(86) PCT No.: PCT/IB2014/066787
§ 371 (c)(1),
(2) Date: Jul. 6, 2016

(87) PCT Pub. No.: WO2015/110880
PCT Pub. Date: Jul. 30, 2015

(65) Prior Publication Data
US 2016/0329053 A1    Nov. 10, 2016

(30) Foreign Application Priority Data
Jan. 24, 2014  (EP) .................................... 14152534

(51) Int. Cl.
*G10L 17/00*     (2013.01)
*G06F 17/00*     (2006.01)
(Continued)

(52) U.S. Cl.
CPC .............. *G10L 17/08* (2013.01); *G06F 1/163* (2013.01); *G06F 1/1694* (2013.01); *G06F 3/017* (2013.01);
(Continued)

(58) Field of Classification Search
CPC ......... G10L 17/08; G10L 17/04; G10L 25/54; G10L 15/26; G06K 9/00221; G06K 9/00;
(Continued)

(56) References Cited

U.S. PATENT DOCUMENTS 9,443,521 B1 * 9/2016 Olguin Olguin ....... G10L 17/00
2002/0032689 A1 * 3/2002 Abbott, III ........ G06F 17/30017
(Continued)

FOREIGN PATENT DOCUMENTS

WO            0144978 A2      6/2001

OTHER PUBLICATIONS

Kanis, M. et al., "Toward Wearable Social Networking with iBand", ACM, 2 Penn Plaza, Suite 701, New York, USA, Apr. 2, 2005-Apr. 7, 2005, XP040017464.
(Continued)

*Primary Examiner* — Fariba Sirjani
(74) *Attorney, Agent, or Firm* — Myers Bigel, P.A.

(57) ABSTRACT

The invention concerns a wearable device 1 comprising a sensor 3 adapted for sensing a body part movement, a controller unit 4 adapted for sampling and processing data from the sensor 3 in order to detect a body part movement, and communication means 5 for communicating with at least one external device. The controller unit 4 is arranged to trigger at least voice capturing upon detection of a body part movement. The invention further concerns a name recalling system 100 comprising a wearable device 1, a mobile phone 20, a microphone 7, 28, 43, processing means 26, 31, a database 27, 32, and a name presentation unit 21, 52. The invention also concerns a method for name recollection.

15 Claims, 5 Drawing Sheets

(51) Int. Cl.
*G10L 17/08* (2013.01)
*G06F 1/16* (2006.01)
*G10L 15/26* (2006.01)
*G10L 25/54* (2013.01)
*G06F 3/01* (2006.01)
*G06K 9/00* (2006.01)
*G10L 17/04* (2013.01)

(52) U.S. Cl.
CPC .......... *G06K 9/00221* (2013.01); *G10L 15/26* (2013.01); *G10L 17/04* (2013.01); *G10L 25/54* (2013.01); *G10L 17/00* (2013.01)

(58) Field of Classification Search
CPC .......... G06F 3/017; G06F 3/01; G06F 1/1694; G06F 1/16; G06F 1/163
See application file for complete search history.

(56) References Cited

U.S. PATENT DOCUMENTS

| | | | | |
|---|---|---|---|---|
| 2002/0181773 A1* | 12/2002 | Higaki | ............... | G06K 9/00335 382/190 |
| 2006/0195322 A1* | 8/2006 | Broussard | ............ | G11B 27/034 704/270 |
| 2008/0112598 A1* | 5/2008 | Gabara | .................. | G10L 17/00 382/116 |
| 2009/0051648 A1 | 2/2009 | Shamaie et al. | | |
| 2009/0190728 A1* | 7/2009 | Bushnell | ........... | G06F 17/30864 379/88.17 |
| 2012/0306643 A1* | 12/2012 | Dugan | ..................... | A61B 5/02 340/539.12 |
| 2014/0037262 A1* | 2/2014 | Sako | ........................ | H04N 5/77 386/223 |
| 2014/0314214 A1* | 10/2014 | Manav | .............. | H04M 3/42093 379/88.01 |
| 2015/0081544 A1* | 3/2015 | Schulz | ............. | G06Q 20/40145 705/44 |
| 2015/0084859 A1* | 3/2015 | Itzhaik | .................... | G06F 3/017 345/156 |
| 2015/0142596 A1* | 5/2015 | Jakobson | ............. | G06Q 20/085 705/24 |
| 2016/0291699 A1* | 10/2016 | Katz | ....................... | G06F 3/011 |
| 2016/0329053 A1* | 11/2016 | Grahm | ................... | G06F 1/163 |

OTHER PUBLICATIONS

Pentland A. Ed-Jain A K et al., "Smart rooms, smart clothes", Pattern Recognition, 1998. Proceedings. Fourteenth International Conference on. Brisbane, QLD., Australia, Aug. 16-20, 1998, Los Alamitos, CA, USA, IEEE Comput. Soc., US, vol. 2, Aug. 16, 1998, pp. 949-953, XP010297736, DOI: 10.1109/ICPR.1998.711845, ISBN: 978-0-8186-8512-5.

International Search Report and Written Opinion; Apr. 7, 2015; issued in International Patent Application No. PCT/IB2014/066787.

European Patent Office; Communication Pursuant to Article 94(3) EPC; May 8, 2018; issued in European Patent Application No. 14152534.5.

* cited by examiner

WEARABLE DEVICE, SYSTEM AND METHOD FOR NAME RECOLLECTION

TECHNICAL FIELD

This invention relates to a wearable device for capturing a name by use of a body part movement. The invention also relates to a name recalling system comprising said wearable device, a microphone, and a mobile phone as well as a method for name recollection using such a system. The invention is particularly advantageous for collecting and storing names of people.

BACKGROUND ART

Many people find it hard to remember names, especially of persons they have only met once before, or if they are introduced to many persons at the same occasion. It may be really embarrassing not being able to recall the name of a person with whom you met previously or were introduced to just a few minutes ago. Without remembering the names of persons you encounter, it can be hard to be an efficient professional or socialiser.

A known solution to this problem is to use wireless contact information exchangers in the form of bracelets. If two persons wearing such bracelets shake hands, their respective contact information will automatically be transferred to the other person's bracelet. The drawback of this solution is that it requires both persons to wear such a device in order for contact information to be exchanged. Hence, you have to rely on other people also being equipped with a device compatible with your own.

There is thus a need for an improved device removing the above mentioned disadvantage.

SUMMARY

An object of the present invention is to provide an inventive product for helping a user remembering the names of people she has been introduced to where the previously mentioned problem is at least partly avoided. This object is achieved by the features of claim 1.

The invention concerns a wearable device comprising a sensor adapted for sensing a body part movement, a controller unit adapted for sampling and processing data from the sensor in order to detect a body part movement, and communication means for communicating with at least one external device. The controller unit is arranged to trigger at least voice capturing upon detection of the body part movement.

An advantage of the claimed invention is thus that the name of a person automatically is collected as the user is introduced to that person. This results in reduced burden on the user's memory and also reduced stress as the user does not need to feel anxious about not remembering the other person's name. The wearable device may be particularly advantageous on occasions with many new people, e.g. at large business meetings, whose names you ought to remember.

Further advantages are achieved by implementing one or several of the features of the dependent claims.

In one aspect of the invention, the wearable device further comprises an internal microphone. The voice capturing is provided by this internal microphone. An internal microphone is positioned close to the controller unit which allows for the trigger signal to be communicated very quickly and hence for the voice capturing to start quickly, thus reducing the latency and hence reducing the risk of missing the name of the other person. If the body part movement is defined to be a handshake movement, the wearable device for detecting the handshake is suitably worn on the hand or arm used for shaking hands. In such case, a microphone comprised in the wearable device is well positioned for capturing the voice of the other person in connection to a handshake.

In another aspect of the invention, the voice capturing is provided by an external microphone. The wearable device communicates a triggering signal for voice being captured by the external microphone, i.e. the external microphone starts voice capturing when receiving a triggering signal from the wearable device. An advantage of this is that the wearable device can be made cheaper and slimmer. This solution is particularly advantageous if the user already carries a device comprising a microphone which is suitably positioned for capturing the voice of a handshaking partner, e.g. a microphone in a pair of smart glasses.

The sensor comprised in the wearable device may be an accelerometer. An accelerometer is suitable for sensing a body part movement since a greeting movement involves many accelerations, i.e. changes in velocity or direction. Preferably, the accelerometer is capable of measuring acceleration along all three Cartesian axes.

The communication means of the wearable device may be a short range wireless communication module. The advantage of using short range wireless communication is that it is wireless, i.e. data can be communicated to other devices without the need for cables. Preferably, the technology of the short range wireless communication module is Bluetooth. Advantages of using a Bluetooth module is that it is small, cheap and has low power consumption.

In one aspect of the invention, the wearable device further comprises a display. This display may be used for presenting information to the user, for example a name. The wearable device may be part of a system, as will be later described, which stores voice profiles and names of persons whose voice has been captured in connection to a body part movement detected by the wearable device. Upon a later encounter with a person, his/her name might be presented on the display in order to help the user recalling the name of that person. The advantage of presenting the name on a display on the wearable device is that the name can be easily glanced by the user.

In one aspect of the invention, the wearable device may further comprise a camera. This allows for taking pictures of persons the user is introducing her to.

In one aspect of the invention the controller unit may further be adapted to trigger taking a picture upon detection of a handshake movement. That is, when a body part movement is detected, the controller unit triggers a camera—either comprised in the wearable device or externally—to take a picture. The advantage of this is that a picture automatically is taken of the person the user is introducing her to.

In one aspect of the invention, the body part movement is a handshake movement. The advantage of detecting a handshake movement is that shaking hands is an easily detectable act of introduction which is common in many parts of the world.

In one aspect of the invention the controller unit may further be adapted to trigger handshake pattern recognition upon detection of a handshake movement. This allows for a handshake pattern for each person the user is shaking hands with to be stored. Next time the user shakes hands with the same person, he/she might be recognized via his/her handshake pattern. The handshake pattern of a person is preferably coupled to the name of the person, such that the person's name can be presented to the user upon shaking hands with that person.

In one aspect of the invention, the wearable device may be adapted to be worn on a hand, wrist, or arm. It is principally these body parts that move during a handshake movement, and hence they are particularly suitable for placing a wearable device for detecting handshake movements upon. The wearable device may take the shape of for example a bracelet, a wrist band, a wristwatch, a glove, or a finger ring. Other shapes are also possible.

This disclosure further concerns a name recalling system comprising:

wearable device comprising a sensor adapted for sensing a handshake movement, a controller unit adapted for sampling and processing data from the sensor in order to detect a body part movement, and communication means. The controller unit is arranged to trigger at least voice capturing upon detection of a body part movement.

A microphone arranged for voice capturing upon reception of a trigger signal from the controller unit. The voice capturing renders a voice recording.

A mobile phone.

Processing means adapted for performing voice profiling and speech recognition on the voice recording. The voice profiling renders a voice profile and the speech recognition renders a name.

A database comprising at least the rendered voice profiles and their associated names, and A name presentation unit for presenting the name of a person upon matching of his/her voice profile with a voice profile stored in the database.

In one aspect of the invention, the name recalling system works as follows. The wearable device detects when the user performs a body part movement, typically when greeting another person as they introduce themselves to each other. The detection of a body part movement triggers voice capturing via the microphone. The microphone may be located internally in the wearable device, or externally such as in the mobile phone, in a pair of smart glasses, in an earpiece, or elsewhere. The system may comprise one microphone, two microphones or an array of microphones responsible for the voice capturing. The voice capturing aims at recording the voice of the other person as he speaks his name. The captured voice recording is passed on to the processing means where voice profiling and speech recognition is performed The name is then stored together with the associated voice profile in a database. On a later occasion, when a voice matching a stored voice profile is captured by the name recalling system, the name presentation unit presents the associated name and thus helps the user to recall the name of the other person. The system may scan and identify voices continuously, or perform voice capturing only when triggered to do so, for example manually by the user or upon detection of a handshake movement. An advantage of such a system is that it helps the user to recall names of persons to whom she has previously been introduced. A further advantage is that the system is completely independent—it does not rely on the other person being equipped in any way.

In one aspect of the invention the processing means may be provided either in the mobile phone or in the cloud. The database may also be provided either in the mobile phone or in the cloud. The term "the cloud" refers to network-based services such as processing power, storage and other functions provided via the internet. The wearable device preferably communicates with the mobile phone via a short range wireless technology such as Bluetooth. The internet connection which generally is required for accessing the cloud is provided by the mobile phone.

An advantage of having the processing means and the database in the mobile phone is that one is not dependent on connection to the internet. This is particularly advantageous in places where the mobile phone is out of radio coverage. The advantage of having the processing means and the database in the cloud is that the cloud may provide more powerful processing means and larger sized databases than a mobile phone. Also, it does not burden the mobile phones limited processor and storage capacity.

In one aspect of the invention, the system further comprises an earpiece. In such case, the name presentation unit may be constituted by a loudspeaker comprised in said earpiece. The advantage of such a name presentation unit is that the name associated to a recognized voice may be spoken directly into the ear of the user. This is a very discrete way of informing the user of the name of the person speaking, as the name being spoken into the ear of the user hardly can be noticed by anyone else. The name spoken may either be text translated into words spoken by a computer voice, or the original voice recording captured when greeting the person.

In another aspect of the invention, the name presentation unit is a display. Names are preferably presented as text in the display. The display may be located for example on the wearable device or on the mobile phone.

The name recalling system may further comprise a camera arranged for taking a picture upon reception of a trigger signal from the controller unit and wherein the processing means further is adapted for performing face recognition. The purpose is to take a picture of the person the user is greeting. The face recognition renders a face profile of the photographed person, which face profile may be stored in the database with the associated voice profile and name. When the user subsequently points the camera towards that person, his/her face will be compared to stored face profiles. If there is a match, the name associated to the matching face profile is presented to the user. The camera may be located for example in the wearable device, in the mobile phone, or in a pair of smart glasses worn by the user.

The system may further comprise a pair of smart glasses. The glasses may comprise one or more of the microphone for voice capturing, the camera for taking pictures, and/or the name presentation unit in the form of either a display or a loudspeaker. The smart glasses are worn by the user.

The database may be extended with database records received from other users. The other users may be for example friends, colleagues, or members of a common community. In such way, the user may be informed of the name also of persons the other user has been introduced to. This may provide an advantage since it helps the user to identify persons whom she only knows by name but not by sight or voice. More generally, sharing of database records enables identification of unknown people, for example of potentially dangerous criminals. The exchange of database records may take place in real-time between several users within a local area.

This disclosure further concerns a method for name recollection using a name recalling system as described above. The method comprises the steps of:

upon detection of a body part movement, performing voice capturing to obtain a voice recording of a person speaking;

performing voice profiling upon the voice recording to achieve a voice profile;

extracting a name from the voice recording by means of automatic speech recognition;

storing the voice profile and the name in a database;

upon later recognition of a voice matching a voice profile stored in the database, presenting the associated name.

Examples of algorithms that can be used to correlate a voice profile with voice profiles stored in the database are different kinds of maximum likelihood search algorithms and suboptimum such, e.g. optimal Viterbi algorithm or different sub-optimal tree-search algorithms.

An advantage of this method is that it helps the user to recall names of persons to whom she has previously been introduced. In such way, she can avoid the embarrassment that typically arises when forgetting a name of someone you already met. Thus, the method provides social networking benefits to the user.

The automatic speech recognition may be aided by manual text input of the name by a user. Thus, in case the automatic speech recognition fails to extract a name out of the spoken words, or if the other person omits to say his first name or family name, the user can input the name manually. The manual text input is done using e.g. the text input device on the mobile phone.

The method may further comprise the step of storing the place and/or time of the detected body part movement together with the voice profile and the associated name. This enables the user to later remind her of when and where she met a specific person. Stored information about place or time for the handshake may also be used to constrain the search in the database and shorten the search time when a person is to be identified upon a later encounter in the same location or at approximately the same hour. Other potentially useful information about the person may also be stored together with the name, for example employer, general interests or preferences. Such information can be useful e.g. for sales people.

The detection of a body part movement may further trigger taking a picture of the person speaking followed by the steps of:

performing face recognition upon the picture to achieve a face profile of the person;

store the face profile in the database together with the voice profile and the associated name;

upon later encounter, taking a picture of the person and perform face recognition;

compare the obtained face profile to stored face profiles;

present the name associated to the matching, stored face profile;

This provides the advantage of the user being able to obtain the name of a previously met person also when she cannot hear that person speaking.

If the body part movement is a handshake movement, the method may involve a handshake pattern of the handshake movement being stored in the database together with the associated name. Upon later recognition of the handshake pattern, the associated name is presented. Sometimes, especially when meeting again, people do not say their names but just shake hands. Storing a handshake pattern allows the user to obtain the name of a previously met person only by shaking his hand.

It would also possible to combine handshake pattern, voice profile and face profile to identify the name of a person.

The method may involve presenting the name visually. The method may further involve presenting the name audible.

The method may further involve sharing of database records among users. If several users co-operate, the database records may be exchanged in real time, within a local area, so that names recorded by a one user can by recalled by the other users.

In one aspect of the method, side information such as location data, time, or calendar data is correlated to the voice profile stored in the database. The side information is used to constrain the search for a matching voice profile or face profile in the database. The advantage of constraining the database search is that the search time is shortened. Location data is a useful search constrainer if the person to be identified was encountered in the same location at the first occasion. Calendar data is a useful search constrainer if the person to be identified is encountered during a meeting with participants scheduled and named in the user's digital calendar. And time is a useful search constrainer if a person is usually encountered around the same hour.

BRIEF DESCRIPTION OF DRAWINGS

In the detailed description of the invention given below reference is made to the following figures, in which.

DESCRIPTION OF EMBODIMENTS

Various aspects of the invention will hereinafter be described in conjunction with the appended drawings to illustrate but not to limit the invention. Variations of the inventive aspects are not restricted to the specifically shown embodiment, but are applicable on other variations of the invention. Like designations denote like elements.

Figure 1:
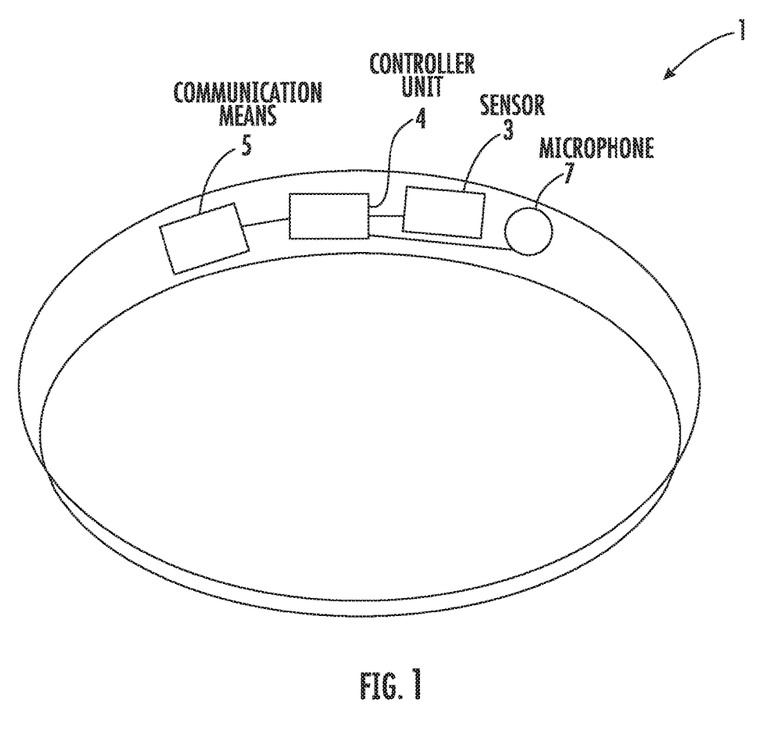
FIG. 1 shows a schematic overview of an example of the disclosed wearable device.
Figure 2:
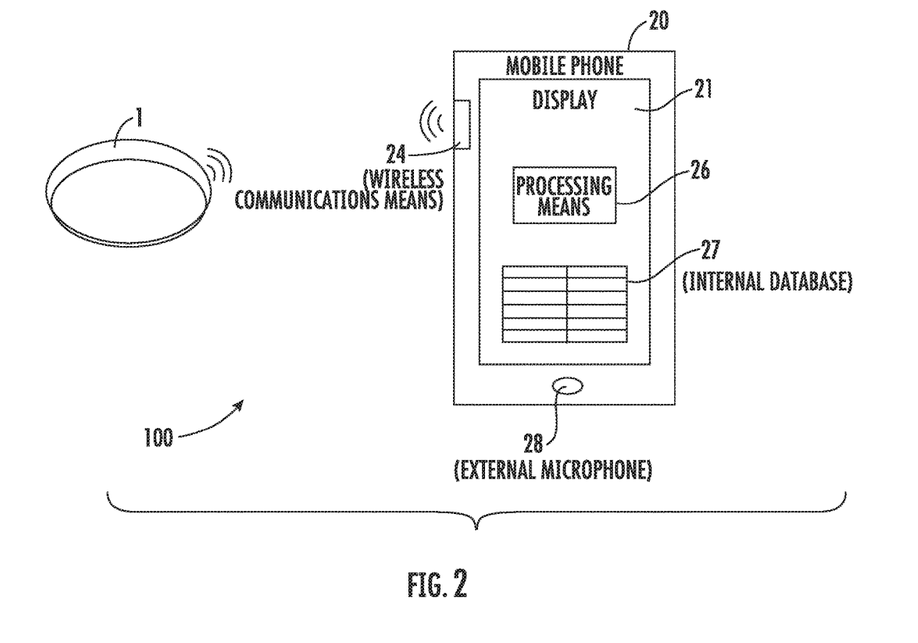
FIG. 2 shows a schematic overview of a first embodiment of the disclosed name recalling system.
Figure 3:
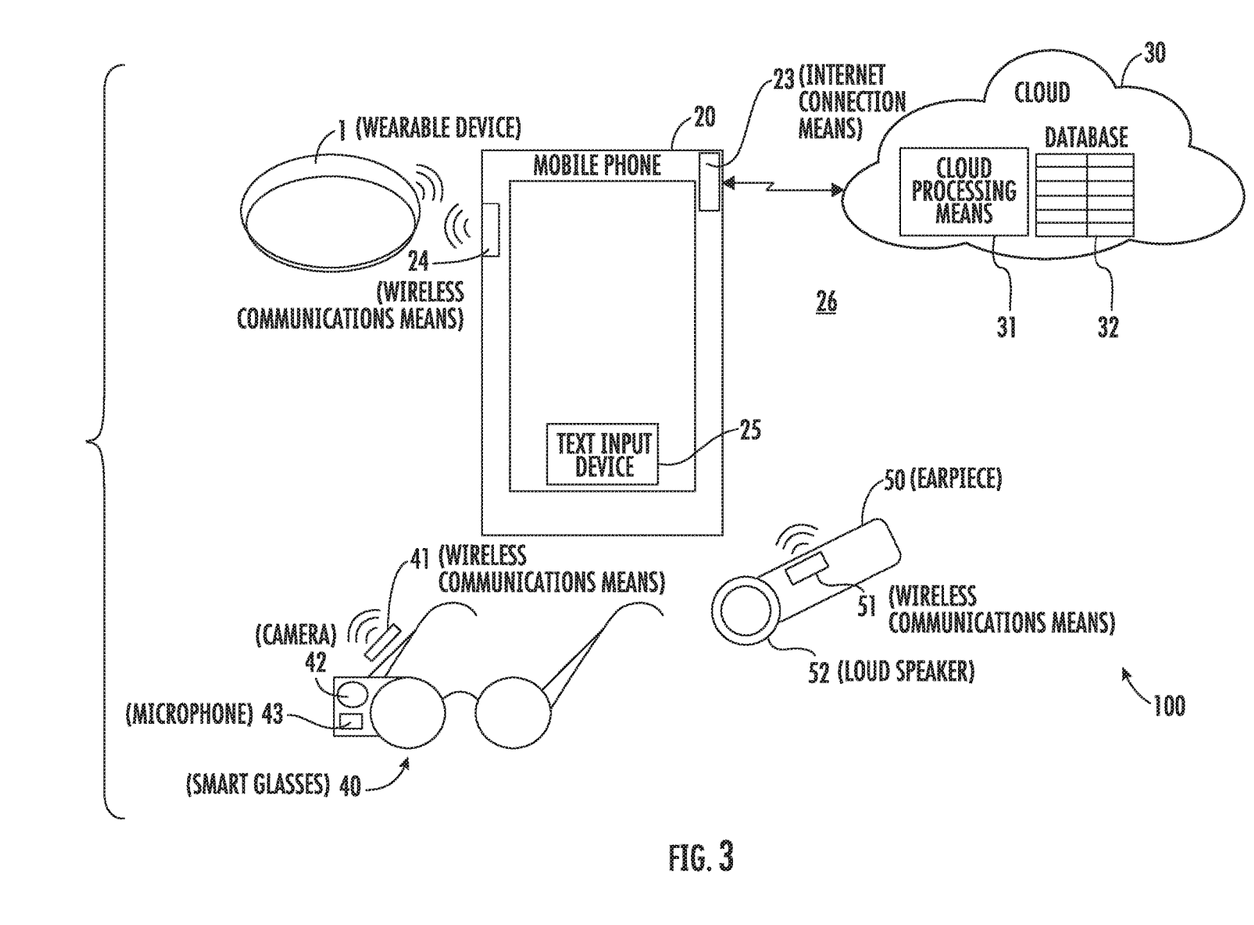
FIG. 3 shows a schematic overview of a second embodiment of the name recalling system.

FIG. 1 shows a schematic overview of an example of the wearable device 1. In this example, the wearable device 1 is a wrist band, sometimes also referred to as a wristlet or bracelet, intended for a user to wear around the wrist of the arm she uses for shaking hands with people. In one aspect of the invention, the wearable device 1 comprises a sensor 3, a controller unit 4, communication means 5, and a microphone 7. In one example, as shown in FIG. 1, is the microphone placed in the wearable device 1, thus is an internal microphone. In another example, is the microphone is placed outside the wearable device, as shown in FIGS. 2 and 3, thus is an external microphone. The sensor 3 is capable of sensing a body part movement.

The body part movement is a predefined movement of a predefined part of the body. The body part movement is selected from a group of greeting movements comprising for example a handshake movement, nodding, bowing, or nose rubbing. In other words, the wearable device detects when a user wearing the wearable device introduces herself to another person. The detected body part movement triggers voice capturing, i.e. recording of sound for example by use of a microphone. When two people meet for the first time, they generally introduce themselves by performing a greeting movement and subsequently saying their names. Hence, voice capturing triggered by a body part movement as defined above generally results in recording the other person's name as he/she speaks it.

In one aspect of the invention, the body movement is a handshake movement. As used herein, the term "handshake movement" refers to a movement similar to shaking hands with a person, i.e. a vertical movement of approximately 1-20 cm of the hand and forearm of a user. The handshake movement usually involves the user holding another person's hand. However, a handshake movement can also be performed without holding someone's hand—a user of the wearable device may mimic a handshake with her hand and forearm Mimicking a handshake allows the user to trigger the voice capturing also if the other person for some reason does not want to shake the user's hand but prefers to just says his/her name in order to introduce him/herself. The controller unit 4 further is adapted to trigger handshake pattern recognition upon detection of a handshake movement.

In one example the sensor is an accelerometer, preferably capable of measuring acceleration in three directions, i.e. along the three Cartesian axes. Another suitable sensor is a gyroscope which provides a refined description of the movement compared to an accelerometer. Another alternative would be to combine an accelerometer and a gyroscope—the accelerometer detects the initiation of the body part movement and starts up the gyroscope which measures the movement in detail. The sensor 3 is connected to the controller unit 4 which collects and analyses measurement data from the sensor 3 in order to determine if a body part movement, in this example a handshake movement, has been performed by the user. When the controller unit 4 detects a handshake movement it sends a trigger signal to the internal microphone 7 which starts voice capturing, i.e. recording of sound, upon reception of the trigger signal. The resulting voice recording is communicated via the communication means 5 to an external unit for further processing. Note however that the internal microphone 7 is not essential to the wearable device—the voice capturing could just as well be performed by a microphone external to the wearable device 1. In such case, the trigger signal created by the controller unit 4 upon detection of a handshake movement would be communicated to an external device by the communicating means 5 in order to trigger voice capture by the external microphone.

In one example, the communication means 5 is a Bluetooth module, which uses a short-range wireless technology. However, it would also be possible to use other short-range wireless technologies. Wired communication means would also be possible.

In one example, the wearable device further comprises a camera and wherein the controller unit 4 further is adapted to trigger taking a picture upon detection of a body part movement, i.e. a handshake movement.

In one aspect of the invention, the wearable device is adapted to be worn on a hand, wrist, or arm. In one example, the wearable device takes the shape of any of a bracelet, a wrist band, a wristwatch, a glove, or a finger ring.

FIG. 2 shows a schematic overview of one embodiment of the inventive name recalling system 100. The idea of the system 100 is to record the name spoken by another person as he introduces himself to the user of the system. The voice profile and name are stored. On a later occasion, when the voice of that person is recognised, his name is presented to the user to help her recall the name of the person. The system comprises a wearable device 1, as described in connection to FIG. 1, and a mobile phone 20. The mobile phone comprises short range wireless communication means 24, a display 21, internal processing means 26, and an internal database 27. The wireless communication means 24 is arranged for communicating with the communication means 5 in the wearable device 1. As the wearable device 1 detects a body part movement, as described in connection to FIG. 1, voice capturing is performed either by an internal microphone 7 in the wearable device 1 or by an external microphone 28 provided in the mobile phone 20. If the voice capturing is performed by an internal microphone 7, the resulting voice recording is buffered in the wearable device 1 and then communicated to the mobile phone 20. The voice recording is passed on to the processing means 26 provided in the mobile phone 20. The processing means 26 is adapted for performing voice profiling and voice recording and has the task of analysing the voice recording in order to create a voice profile substantially unique to the person speaking in the voice recording. The processing means 26 also performs automatic speech recognition in order to extract a name from the voice recording and translate it into written text. The voice profile 71 and the associated name are stored in a local database 27 provided in the mobile phone 1. The database 27, 32 comprises at least the rendered voice profiles 71 and their associated names 70 and a name presentation unit 21, 52 for presenting the name 70 of a person upon matching of his/her voice profile with a voice profile 71 stored in the database 27, 32.

As used herein, the term "voice profiling" means analysing the voice recording and creating a voice profile substantially unique to the other person based on his voice parameters. Methods for voice profiling are already known. "Speech recognition" refers to automatic translation of spoken words into written text. The purpose of performing speech recognition on the voice recording is to convert the name spoken by the other person during the act of introduction into written text.

Voice recordings captured by the system upon later occasions are also analysed by the processing means 26. If the voice profile of the voice recording matches a voice profile already stored in the database 27, the name corresponding to the stored voice profile is displayed in the display 21 of the mobile phone 20. Hence, the user can glance at the display 21 of her mobile phone 1 to be reminded of the name of the person speaking. Alternatively, the corresponding name could be communicated to the wearable device 1 and shown as text in a display (not shown) provided in the wearable device 1.

FIG. 3 shows another embodiment of the name recalling system 100. This embodiment comprises a wearable device 1, a mobile phone 20, a pair of smart glasses 40, and an earpiece 50. The wearable device 1 is similar to that depicted in FIG. 1, except that it does not comprise an internal microphone 7. In addition to the wearable device 1, the user wears a pair of smart glasses 40 comprising short range wireless communication means 41 and a microphone 43. The smart glasses also comprise a camera 42. The user also wears an earpiece 50 comprising short range wireless communications means 51 and a loudspeaker 52. As the wearable device 1 detects a body part movement in the form of a handshake movement of the user, it communicates a trigger signal for voice capturing to the microphone 43 and if there is a camera 42 communicating a trigger signal to the camera for taking a picture. The trigger signal is either sent directly from the wearable device 1 to the smart glasses 40 or via the mobile phone 20. The communication of the trigger signal is handled by the short range wireless communication means 5, 24, 41. The voice recording resulting from the voice capture and the picture are communicated from the smart glasses 40 to the mobile phone 20 via the short range wireless communication means 41, 24. The mobile phone 20 comprises internet connection means 23 in order to provide access to the cloud 30. "The cloud" is an established term for internet-based services, such as processing and data storage. The mobile phone 20 forwards the voice recording and the picture to the cloud 30 for processing by cloud processing means 31. The processing includes voice profiling and automatic speech recognition of the voice recording, as well as face recognition of the picture. The resulting voice profile, name, and face profile are stored in a cloud database 32. Should the automatic speech recognition for some reason fail to extract a name, the user may manually input the name as text (while she still remembers it) using a text input device 25 provided in the mobile phone 20. Optionally, the voice recording is also stored in the database 32.

If the user upon a later encounter with a person does not recall the person's name, she has two alternatives. Either, she may point the camera 42 towards the person, taking a picture of his/her face. The picture is communicated via the mobile phone 20 to the cloud 30, where cloud processing means 31 performs face profiling and compares the obtained face profile to face profiles stored in the database 32. If a matching face profile is found in the database 32, the name corresponding to the face profile is read out by a computerised voice in the loudspeaker 52 of the earpiece 50. Alternatively, if the other person is speaking, the user may trigger voice capturing by the microphone 43. The voice recording is passed on to the cloud processing means 31 via the mobile phone 21. The cloud processing means 31 performs voice profiling on the voice recording and compares the resulting voice profile to voice profiles stored in the database 32. If a matching voice profile is found in the database 32, the name corresponding to that voice profile is read out in the loudspeaker 52 of the earpiece 50. The loudspeaker 52 is arranged to send out sound directly into the ear of the user, such that the read out name is heard only by the user. As an alternative to reading out the name, the original voice recording (if stored in the cloud database 32) may be played to the user in the loudspeaker 52 as the voice recording is expected to comprise the sought-after name.

Figure 4:
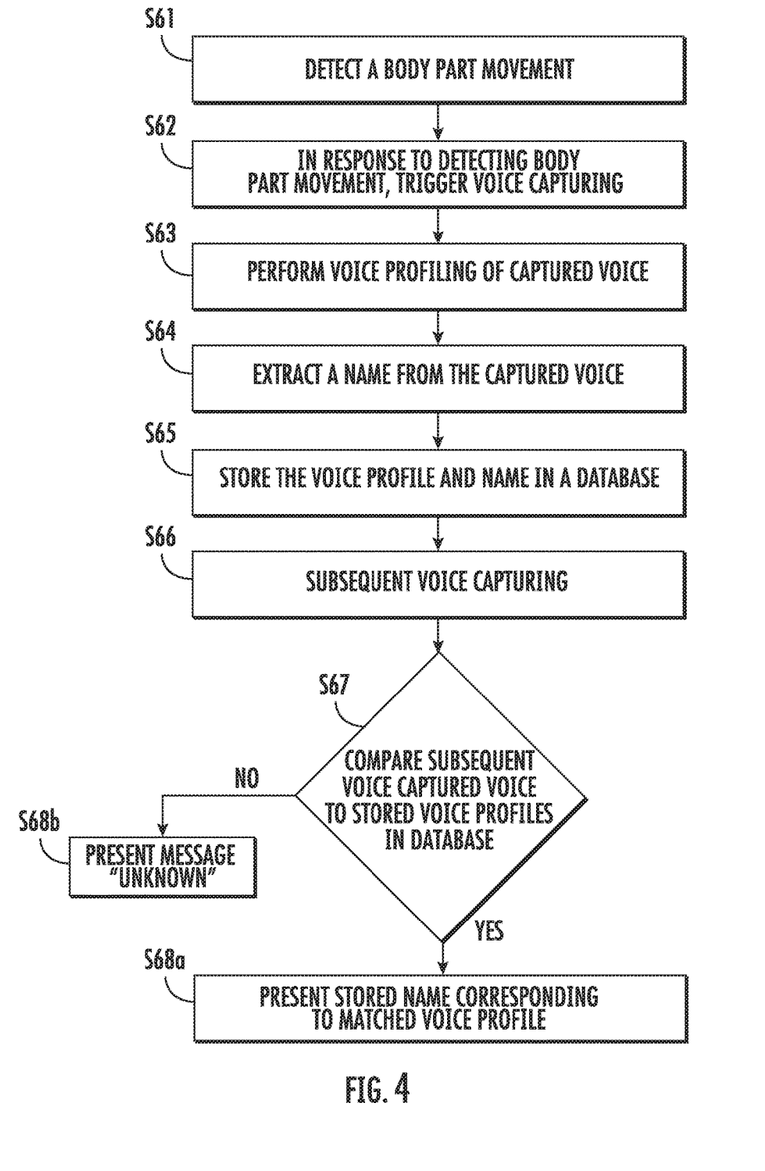
FIG. 4 shows a flow chart of an example of the disclosed method for name recollection.

FIG. 4 shows a flow chart of an example of the disclosed method for name recollection. Steps S61-S65 concerns collecting information about a person upon a first encounter. The first step S61 is to detect a body part movement, for example a handshake movement, a bow, or a nod. The detection of the body part movement immediately triggers a second step S62 of voice capturing. It is important that the voice capturing starts more or less immediately after a detected body part movement in order to improve the chances of capturing the other person speaking his/her name. After voice capturing follows a third step S63 of performing voice profiling upon the voice recording captured in the second step S62. The voice profiling results in a voice profile substantially unique for the person whose voice was captured in the voice recording. As a fourth step S64, a name is extracted from the voice recording obtained in the second step S62 using automatic speech recognition. In one example, the automatic speech recognition is aided by manual text input of the name by a user. Note however that the fourth step S64 equally well may be performed before or simultaneous to the third step S63. Subsequently, as a fifth step S65, the voice profile from step three S63 and the name obtained in step four S64 are stored in a database. Steps S61-S65 generally follows more or less immediately after each other. However, it is also possibly to temporarily store the voice recording obtained in the second step S62 before moving on to the third step S63.

Steps S66-S68 concerns recognising the person upon a later encounter and presenting the person's name. A considerable amount of time may elapse before moving on to steps S66-S68. Also, additional sets of steps S61-S65 may be performed if additional body part movements are detected before moving on to steps S66-S68.

The sixth step S66 involves voice capturing. The voice capturing of this step may either run continuously or may be triggered manually by a user when meeting a person whose name she does not recall. In the seventh step S67, the voice recording is analysed and compared to stored voice profiles in the database. If the voice recording matches a stored voice profile, an eight step S68a of presenting the stored name corresponding to the matching voice profile follows. However, if there is no matching voice profile, there follows an alternative eight step S68b of presenting the message "unknown", or a message of similar meaning, to the user.

The method illustrated in FIG. 4 may be extended with face recognition and/or handshake pattern recognition as described earlier in this text. In case face recognition is included, a picture is taken in the second step S62, face profiling is performed in the third step S63, and the face profile is stored in the database together with the associated name and voice profile in the fifth step S65. In the act of recognising a person (i.e. steps S66-S67), the voice capturing of the sixth step S66 is either complemented or replaced by taking a picture. In the seventh step S67, the picture is compared to stored face profiles. If a matching face profile is found, the name associated with the matching face profile is presented to the user.

In case handshake pattern recognition is included in the method, the body part movement in the first step S61 preferably is a handshake. The data used to detect the handshake movement is stored. Typically, this data is measurement data from a sensor, such as an accelerometer, worn by the user. In the third step S63, the data is analysed to create a handshake pattern. The handshake pattern is stored in the database together with the associated name and voice profile in the fifth step S65. In the act of recognising a person (i.e. steps S66-S67), the voice capturing in the sixth step S66 is either complemented or replaced by detecting a handshake. In the seventh step S67, the detected handshake is compared to stored handshake patterns. If a matching handshake pattern is found, the name associated with the matching handshake pattern is presented to the user.

Figure 5A:
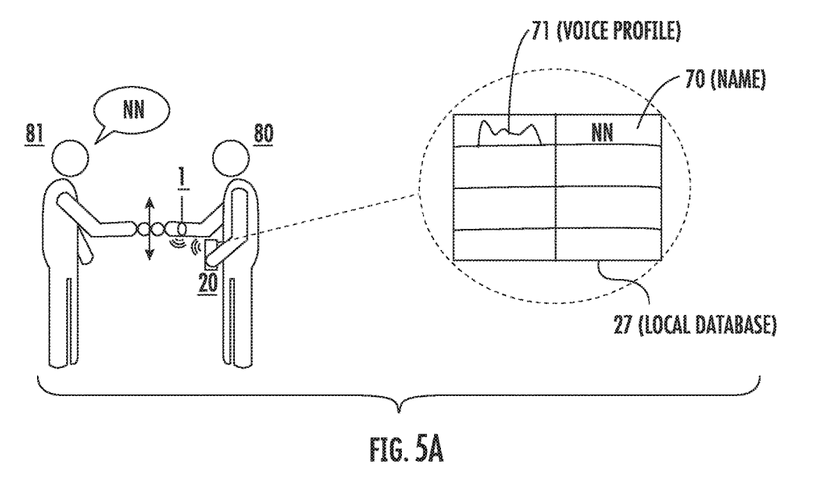
FIG. 5a shows a schematic illustration of an example of the disclosed method for name recollection using the first embodiment of the name recalling system.
Figure 5B:
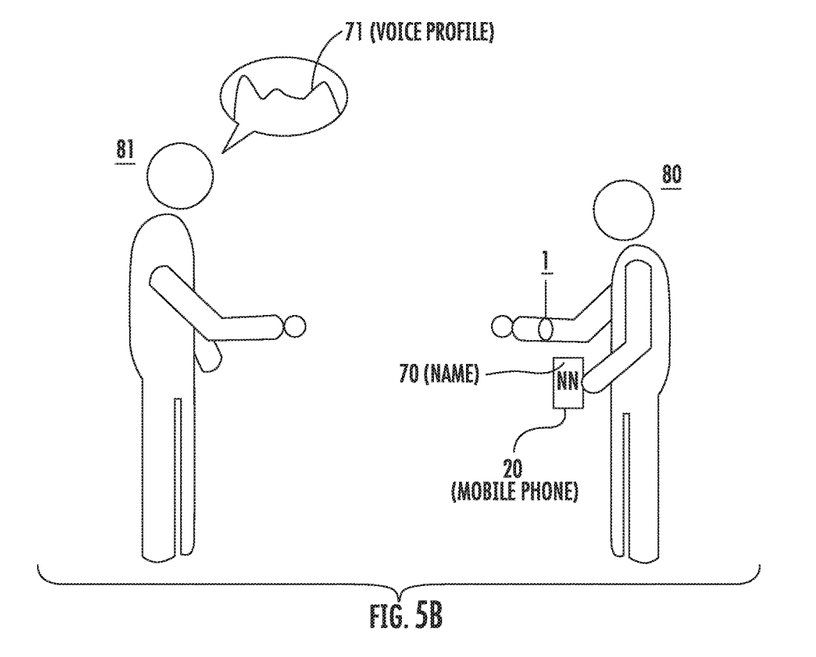
FIG. 5b shows a schematic illustration of an example of the disclosed method for name recollection using the first embodiment of the name recalling system.

FIG. 5a-b shows a schematic illustration of an example of the disclosed method for name recollection using the first embodiment of the name recalling system 100 comprising a wearable device 1 and a mobile phone 20. In FIG. 5a, a user 80 wears the wearable device 1 around her right wrist and carries the mobile phone 20 in her pocket. As she shakes hands with another person 81, the wearable device 1 detects the handshake movement and triggers voice capturing by a microphone comprised in the wearable device. The other person 81 speaks his name, as is customary when introducing yourself to a new person and the spoken name is recorded since the voice capturing is running. The voice recording is communicated to the mobile phone 20 where it is analysed to create a voice profile 71 for the other person 81 and to extract his name 70 as written text. The voice profile 71 and the name 70 are stored in a local database 27 in the mobile phone 20. In one example, the place and/or time of the detected handshake is stored together with the voice profile 71 and the associated name 70.

FIG. 5*b* shows when the user 80 meets the other person 81 on a later occasion. Unfortunately, the user 80 does not remember the name of the other person 81. However, as the other person 81 speaks, the mobile phone 20 analyses his voice and recognises his voice profile 71 from the database. The name 70 corresponding to the recognised voice profile 71 is presented visually on the display 21 of the mobile phone 22. Hence, the user 80 is reminded of the name of the other person 81, without having to ask for it again. In one example, the name of the other person 81 is presented audible in a speaker i.e. comprised in the mobile phone or in the earpiece.

In one aspect of the invention, the database records are shared among users. In one example side information such as location data, time, or calendar data is correlated to the stored voice profile and wherein the side information is used to constrain the search for a matching voice profile in the database.

In all of the figures, the wearable device 1 is illustrated as a wrist band in order for it to be easily recognisable throughout the figures. The invention is however not limited to wrist bands—the wearable device could take the shape of a bracelet, a finger ring, a wrist watch, a glove, or any other device that may be worn by a user such that a sensor comprised in the device is able to sense a predefined body part movement of the user. In most of the above examples, the body part movement has been exemplified by a handshake movement. However, the handshake movement may be replaced by another detectable body part movement, e.g. a nod, bow, or nose rub if the wearable device is adjusted accordingly. For example, a nod or a bow is probably more easily detectable with a wearable device worn on the head instead of around the wrist. A wearable device adapted to be worn on the head may take the shape of e.g. a headband, a pair of glasses, an earpiece, or a headgear.

Reference signs mentioned in the claims should not be seen as limiting the extent of the matter protected by the claims—their function is only to make the claims easier to understand.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. A wearable device worn by a first person comprising:
   a sensor adapted for sensing a predefined movement of a body part of the first person, wherein the predefined movement of the body part is a greeting movement performed by the first person when greeting a second person;
   a controller unit adapted for sampling and processing data received from the sensor in order to detect the movement of the body part, wherein the controller unit is configured to generate a trigger signal to trigger a voice recording of the second person upon detection of the movement of the body part of the first person;
   a microphone arranged for capturing the voice recording of the second person upon reception of the trigger signal from the controller unit, wherein the capturing renders the voice recording;
   a processor adapted for performing voice profiling and speech recognition on the voice recording of the second person, wherein the voice profiling renders a voice profile for the second person based on the voice recording of the second person, wherein the speech recognition renders a name spoken by the second person when being greeted by the first person, and wherein the voice profile of the second person that was rendered and the name of the second person that was rendered are associated together and stored in a database comprising a plurality of voice profiles and their respective associated names; and
   a name presentation device configured to present the name of the second person out of the names stored in the database based on matching a later created voice profile based on a later captured voice with a previously stored voice profile of the second person out of the plurality of voice profiles stored in the database.

2. The wearable device according to claim 1,
   wherein the microphone comprises an internal microphone, and
   wherein the capturing of the voice recording is provided by the internal microphone.

3. The wearable device according to claim 1,
   wherein the capturing is provided by an external microphone, and
   wherein the wearable device communicates the trigger signal for the capturing of the voice recording of the second person by the external microphone.

4. The wearable device according to claim 1, wherein the sensor is an accelerometer.

5. The wearable device according to claim 1, wherein the wearable device further comprises a camera.

6. The wearable device according to claim 1, wherein the controller unit further is arranged to trigger capturing of an image of the second person upon detection of the predefined movement of the body part.

7. The wearable device according to claim 1, wherein the predefined movement of the body part is a handshake movement.

8. A name recalling system comprising:
   a wearable device worn by a first person comprising:
      a sensor adapted for sensing a predefined movement of a body part of the first person, wherein the predefined movement of the body part is a greeting movement performed by the first person when greeting a second person, and
      a controller unit adapted for sampling and processing data from the sensor in order to detect the movement of the body part, wherein the controller unit is arranged to trigger at least capturing of a voice recording of the second person upon detection of the movement of the body part of the first person;
   a microphone arranged for capturing the voice recording of the second person upon reception of a trigger signal from the controller unit;
   a mobile phone;
   a processor adapted for performing voice profiling and speech recognition on the voice recording of the second person, the voice profiling rendering a voice profile for the second person and the speech recognition rendering a name of the second person;
   a database comprising at least a plurality of voice profiles, wherein ones of the plurality of voice profiles are associated with ones of corresponding names, wherein the database stores the voice profile of the second person as associated with the name of the second person that was recognized; and
   a name presentation device for presenting the name of the second person out of the ones of the corresponding names in the database upon matching a later captured voice profile with the voice profile of the second person out of the plurality of voice profiles stored in the database.

9. The name recalling system according to claim 8, wherein the mobile phone comprises an Internet connection to a cloud, and
wherein the processor and the database are provided in the cloud.

10. The name recalling system according to claim 8, wherein the
system further comprises an earpiece, and wherein the name presentation unit is a loudspeaker comprised in the earpiece.

11. The name recalling system according to claim 8, wherein the
system further comprises a camera arranged for capturing an image upon reception of a trigger signal from the controller unit and wherein the processor further is adapted for
performing face recognition, the face recognition rendering a face profile, and wherein the database further comprises rendered face profiles.

12. The name recalling system according to claim 8, wherein the system further comprises a pair of smart glasses.

13. A method for name recollection using a name recalling system comprising the wearable device worn by the first person according to claim 8, wherein the method comprises:
upon detection of predefined movement of a body part of the first person, capturing a voice recording of the second person;
performing voice profiling upon the voice recording to achieve a voice profile of the second person;
extracting a name from the voice recording by automatic speech recognition;
storing the voice profile of the second person and the name extracted from the voice recording, as associated together in a database; and
upon later recognition of the voice matching a voice profile of the second person stored in the database, presenting the associated name of the first person,
wherein the predefined movement of the body is a greeting movement performed by the first person when greeting the second person.

14. The method according to claim 13, wherein detection of the predefined movement of the body part further triggers capturing an image of the second person followed by operations comprising:
performing face recognition upon the image to achieve a face profile of the second person;
storing the face profile in the database together with the voice profile and the associated name;
upon later encounter, capturing an image of the second person and perform face recognition;
comparing the obtained face profile to stored face profiles; and
presenting the name associated to the matching, stored face profile.

15. The method according to claim 13, wherein the predefined movement of the body part is a handshake movement and a handshake pattern of the handshake movement is stored in the database together with the associated name and wherein the name is presented upon later recognition of the handshake pattern.

* * * * *